United States Patent [19]
Togawa

[11] Patent Number: 5,725,406
[45] Date of Patent: Mar. 10, 1998

[54] PLASMA ADDRESSED DISPLAY DEVICE

[75] Inventor: Takahiro Togawa, Kanagawa, Japan

[73] Assignee: Sony Corporation, Tokyo, Japan

[21] Appl. No.: 745,064

[22] Filed: Nov. 7, 1996

Related U.S. Application Data

[62] Division of Ser. No. 519,402, Aug. 25, 1995.

[30] Foreign Application Priority Data

Aug. 26, 1994 [JP] Japan ................................. 6-202107

[51] Int. Cl.⁶ ................................................ H01J 9/26
[52] U.S. Cl. ................................................ 445/24
[58] Field of Search ................. 445/24, 25; 29/424; 313/582–584

[56] References Cited

U.S. PATENT DOCUMENTS

| | | | |
|---|---|---|---|
| 5,124,615 | 6/1992 | Kim | 313/584 X |
| 5,144,200 | 9/1992 | Kim | 445/24 X |
| 5,420,707 | 5/1995 | Miyazaki | 313/582 X |
| 5,526,151 | 6/1996 | Miyazaki et al. | 445/24 X |

FOREIGN PATENT DOCUMENTS

| | | | |
|---|---|---|---|
| 139922 | 5/1994 | Japan | 445/24 |

Primary Examiner—Kenneth J. Ramsey
Attorney, Agent, or Firm—Hill, Steadman & Simpson

[57] ABSTRACT

A plasma addressed display device in which a microsheet glass can be bonded without the risk of cracking and an abnormal local discharge between neighboring cathode electrodes may be prohibited from occurring. The plasma addressed liquid crystal display device is made up of a first substrate having a plurality of first electrodes arranged substantially parallel to one another on its one major surface, and a second substrate having a plurality of second electrodes on its major surface facing the first electrodes on the first substrate. The second electrodes extends substantially parallel to one another and substantially at right angles to the first electrodes, a dielectric sheet arranged between the first and second substrates, a layer of an electro-chemical material provided between the first substrate and the dielectric sheet, a plurality of partitions, as barrier ribs, formed along the second electrodes in a discharge chamber defined between the second substrate and the dielectric sheet, a sealing member arranged between the second electrodes and the dielectric sheet for sealing the discharge chamber, and an insulating film formed in the inside of the sealing member for covering an upper part of the second electrode.

4 Claims, 5 Drawing Sheets

FIG.4A
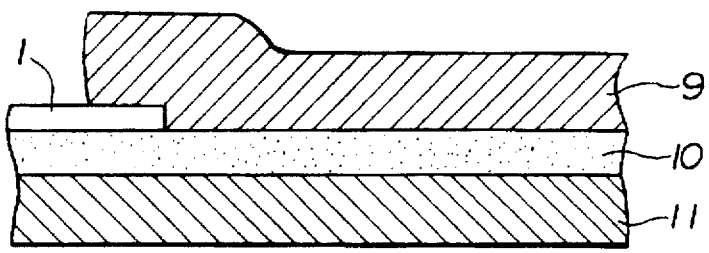
FIG.4B
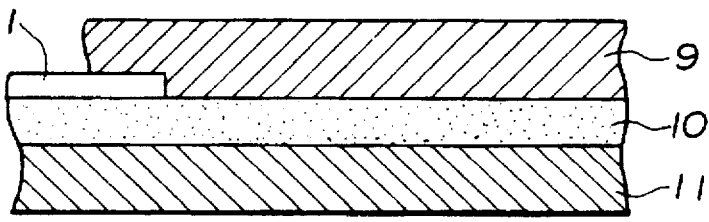
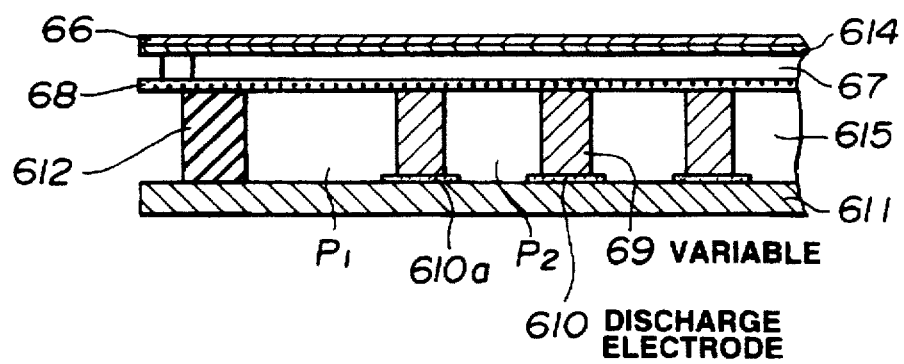
FIG.6
(PRIOR ART)

PLASMA ADDRESSED DISPLAY DEVICE

This is a division, of application Ser. No. 08/519,402, filed Aug. 25, 1995.

BACKGROUND

1. Field of the Invention

This invention relates to a plasma addressed display device which ia a picture display device driving a layer of an electro-optical material by utilizing the plasma for switching a pixel.

2. Background of the Invention

The plasma addressed liquid crystal display device, which is a picture display device for driving a liquid crystal under utilization of plasma discharge, has been disclosed in U.S. Pat. No. 4,898,149 to Buzak (issue date, Jan. 23, 1990) and in U.S. Pat. No. 5,007,553 to Buzak (issue date, Dec. 31, 1991). With the apparatus published in these U.S. patents, a groove constituting a plasma channel is formed by etching. On the other hand, a plasma addressed display device having a simplified construction and suited to high definition display has been disclosed in U.S. patent application No. 07/837,961 for an Electro-Optical Device, filed by Shigeki Miyazaki, on Feb. 20, 1992. The disclosure of the above cited patents and the patent applications are incorporated herein by reference.

Referring to FIG. 8, the construction of a plasma addressed liquid crystal display device is explained briefly.

The plasma addressed liquid crystal display device includes a liquid crystal layer 67, as a layer of an electro-optical material, interposed between a planar, electrically non-conductive and sufficiently optically transparent glass substrate 66 and a glass substrate 611 carrying plural discharge electrodes 610, and a spacing as a discharge area 615 between the liquid crystal layer 67 and the glass substrate 611.

A strip-shaped electrode 614 is formed on one major surface of the glass substrate 66 and a liquid crystal layer 67, such as a nematic liquid crystal layer, is arranged in contact with the electrode 619. This liquid crystal layer 67 is sandwiched between the glass substrate 66 and a microsheet glass 68 which is a thin sheet of a dielectric material. The glass substrate 66, liquid crystal layer 67 and the microsheet glass 68 make up a so-called liquid crystal cell. The microsheet glass 68 operates as an insulating layer between the liquid crystal layer 67 and the discharge area 615.

Plural discharge electrodes 610 are formed on the glass substrate 611 as strip-shaped electrodes and are strayed at a pre-set distance from the microsheet glass 68 by being peripherally supported by frits 612 as sealants. Thus the spacing between the glass substrate 611 and the microsheet glass 68 operates as a discharge area 615 for generating the discharge plasma. The frits mean powdered glass and may be applied by coating.

The discharge electrodes 610 are arranged at equal intervals on the glass substrate 611 and partition walls or so-called barrier ribs 69 are formed on the discharge electrode 610 by printing. The discharge area 615 is sub-divided by a plurality of the barrier ribs 69 for delimiting separate plasma cells $P_1, P_2, \ldots$. These plasma cells $P_1, P_2, \ldots$ are filled with ionizable gases. Examples of these ionizable gases include helium, neon, argon or a mixture thereof.

The barrier ribs 69 are formed on respective striped electrodes of plural discharge electrodes 610 on the scanning unit basis. Thus the plasma cells $P_1, P_2, \ldots$ are associated with respective scanning lines. The barrier ribs 69 may be formed by printing a glass paste mixed with ceramics, such as alumina, a plurality of number of times by a screen printing method. The barrier ribs also play the role of controlling the gap interval, that is the distance between the substrate glass 611 and the microsheet glass 68. The gap interval of the discharge area 615 may be controlled by adjusting the number of times of screen printing or the amount of the glass paste during preparation of the barrier ribs 68 and is usually on the order of 200 μm. A plurality of discharge electrodes may be directly formed on the substrate glass 611 by printing an electrically conductive paste containing e.g., silver powders.

A plurality of electrodes 614, formed with a pre-set width on the major surface of the liquid crystal side glass 66 facing the substrate glass 611 is formed of a transparent electrically conductive material, such as indium tin oxide (ITO), and is optically transparent. The respective electrodes 614 are arrayed parallel to one another and arrayed vertically on the picture surface. A plurality of discharge electrodes 610 are similarly formed on the major surface of the glass substrate 611 facing the glass substrate 66. These discharge electrodes 610 are also parallel linear electrodes. However, these discharge electrodes are arrayed in a direction normal to the electrodes 614 formed on the glass substrate 66. That is, these discharge electrodes are arrayed horizontally on the picture surface. These discharge electrodes 610 are designed as anode electrodes and cathode electrodes arranged in pairs. If the barrier ribs 69 are printed on the discharge electrodes 610, the discharge electrodes 610 are used in common in the plasma cells $P_1, P_2, \ldots$ delimited by these barrier ribs 69. That is, the discharge electrode 610a is simultaneously a discharge electrode for the plasma chamber $P_1$ and a discharge electrode for the plasma chamber $P_2$.

With the above-described plasma addressed liquid crystal display device, the discharge area is formed by coating the frit, that is powdered glass, around the barrier ribs. The step of coating the powdered glass is termed a frit sealing step. After the frit sealing step, the microsheet glass is bonded on the barrier rib. If the frits are intruded into the barrier rib and the microsheet glass, the microsheet glass with a thickness on the order of 50 μm is cracked.

Thus the edge of the barrier rib and the frit coating position are separated from each other a distance equal to 1.8 to 2.0 mm. If the barrier rib and the frit are spaced apart from each other, discharge of the cathode electrodes sequentially leads to local discharge between neighboring cathode electrodes thus incurring breakage of cathode electrodes or shorting.

SUMMARY OF THE INVENTION

It is therefore an object of the present invention to provide a plasma addressed display device in which the microsheet glass can be bonded without the risk of cracking and the local discharge between neighboring cathode electrodes may be prohibited from occurring.

In one aspect, the present invention provides a plasma addressed liquid crystal display device having a first substrate having a plurality of first electrodes arranged substantially parallel to one another on one major surface thereof, and a second substrate having a plurality of second electrodes on a major surface thereof facing the first electrodes on the first substrate. The second electrodes extend substantially parallel to one another and substantially at right angles to the first electrodes. The plasma addressed liquid crystal display device also includes a dielectric sheet arranged between the first and second substrates, a layer of an electro-optical material provided between the first substrate and the dielectric sheet, a plurality of barrier ribs, formed along the second electrodes in a discharge chamber defined between the second substrate and the dielectric sheet, a sealing member arranged between the second electrodes and the dielectric sheet for sealing the discharge chamber and an insulating film formed in the inside of the sealing member for covering an upper part of the second electrode.

Preferably, the barrier ribs are formed on the second electrode, and the insulating film is formed between the second electrode and the barrier ribs. The dielectric sheet may be a microsheet glass having a thickness of not more than 50 μm. The sealing member may be formed of low-melting glass and the layer of the electro-optical material is a liquid crystal layer. The second electrodes may be of a construction of an alternate vertical array of anodes and cathodes and the insulating film covers an upper part of the cathodes. The insulating film may cover the upper part of all the second electrodes.

In another aspect, the present invention provides a plasma addressed liquid crystal display device having a first substrate having a plurality of channels substantially parallel to one another and a pair of discharge electrodes formed as stripes in the channels and having upper parts thereof covered by an insulating layer. The plasma addressed liquid crystal display device also includes a second substrate having a plurality of data electrodes extending substantially at right angles to the discharge electrodes and substantially parallel to one another, a dielectric sheet arranged between the first and second substrates, and a layer of an electro-optical material provided between the first substrate and the dielectric sheet.

In still another aspect, the present invention provides a method for preparing a plasma addressed liquid crystal display device having a plasma cell and a display cell stacked together. The method includes the steps of forming a plurality of discharge electrodes on a substrate, covering the vicinity of contact areas of the discharge electrodes with an insulating film, forming barrier ribs on the discharge electrodes covered by the insulating film, grinding the top of the barrier ribs, arranging a microsheet glass on the ground barrier ribs, bonding the microsheet glass to the substrate with a sealing member to form a plasma cell, and joining the plasma cell and the electro-optical cell.

The discharge electrodes, the insulating film and the barrier ribs may be formed by printing.

With the above-described plasma addressed liquid crystal display device according to the present invention, unfavorable local discharge between neighboring cathodes may be eliminated by coating the vicinity of the contact area of the second electrode by an insulator so that the insulator is contacted with part of second electrode side portions of the barrier ribs and sealing members. In addition, the microsheet glass may be bonded after the frit seal process without cracking the microsheet glass.

BRIEF DESCRIPTION OF THE DRAWINGS

FIGS. 4A and 4B are partial schematic cross-sectional views showing a formed barrier rib.

FIG. 8 is a partial schematic cross-sectional view showing the plasma addressed liquid crystal display device.

DETAILED DESCRIPTION OF THE INVENTION

Figure 1:
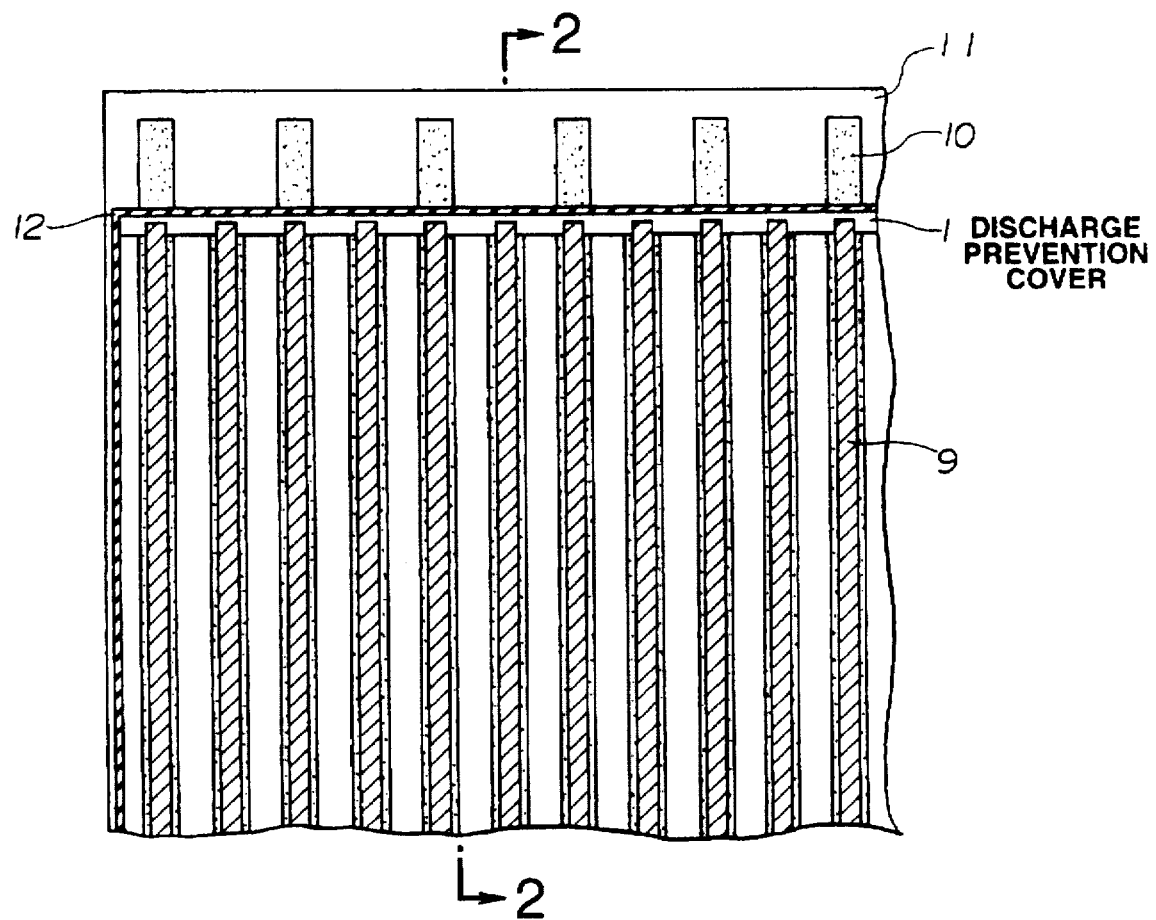
FIG. 1 is a schematic top plan view showing the construction of plasma cells of a plasma addressed liquid crystal display device according to the present invention.

Referring to the drawings, a preferred embodiment of the present invention will be explained in detail.

Figure 2:
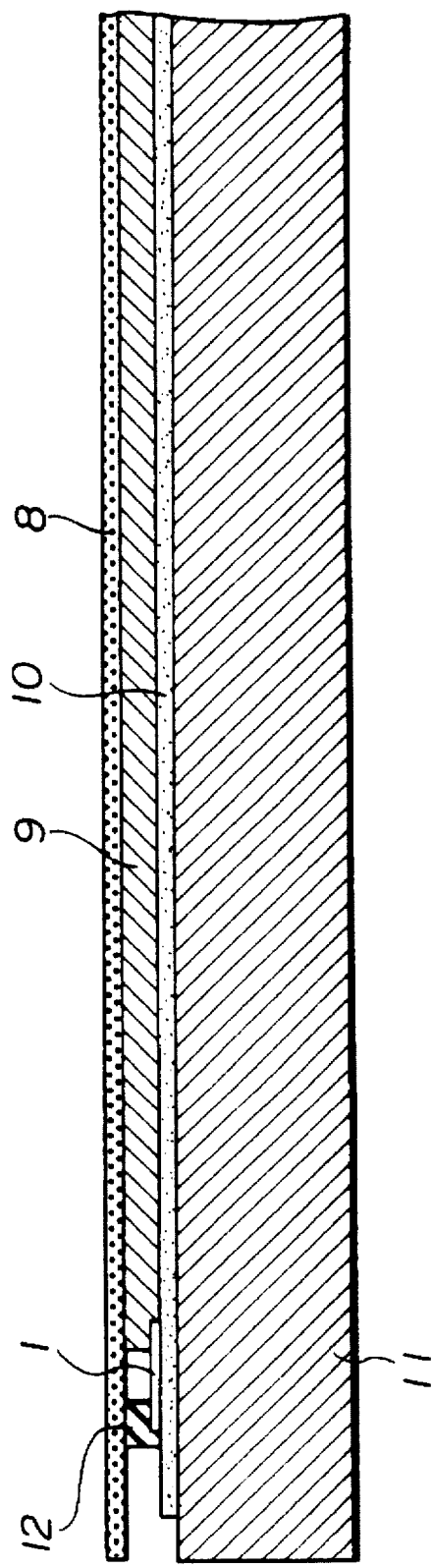
FIG. 2 is a schematic cross-sectional view showing one plasma cell according the resent invention.

The plasma addressed liquid crystal display device according to the present invention has a structure comprised of a display cell and a plasma cell stacked together with the interposition of a dielectric sheet. FIG. 1 shows plasma cells of the plasma addressed liquid crystal display device according to the present invention in a top plan view and FIG. 2 shows the plasma cell shown in FIG. 1 in a cross-sectional view along line D—D' in FIG. 1.

The plasma cell of plasma addressed liquid crystal display device has plural discharge electrodes 10 formed on a glass substrate 11 and barrier ribs 9 printed on the discharge electrodes 10. A frit 12 is coated around the barrier ribs 9 on which is bonded a microsheet glass 8.

On the top of the discharge electrode 10 in the vicinity of the contact area of the discharge electrode 10 is formed a discharge proofing cover 1 which is in contact with a portion of the lower part of the barrier rib 9 and a portion of the lower part of the frit 12. The discharge-proofing cover 1 is of a thickness of 10 to 15 μm and is formed of an insulating material. If the discharge-proofing cover 1 is of increased thickness, the barrier rib 9 tends to be protuberant, such that the microsheet glass bonded thereon tends to be cracked.

With the present plasma cell, anodes and cathodes are alternately formed on the inner surface of the substrate 11 and the contact portion of the cathode electrode is coated with an insulating film. As for the construction of the electrode contact portion, if the anode and the cathode are switched so that one electrode performs the role of both the anode and the cathode, it suffices if the electrode contact portion of each discharge electrode is sheathed with an insulating film.

Referring to FIGS. 3A to 3E, part of the production process of the plasma addressed liquid crystal display device is explained in detail.

Figure 3A:
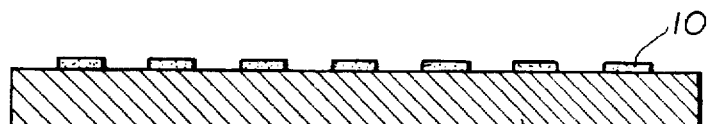
FIGS. 3A to 3E illustrate production process steps for producing the plasma addressed liquid crystal display device according to the present invention.

In FIG. 3A, plural discharge electrodes 10 are formed by printing at an equal interval on the glass substrate 11 and subsequently sintered.

Figure 3B:
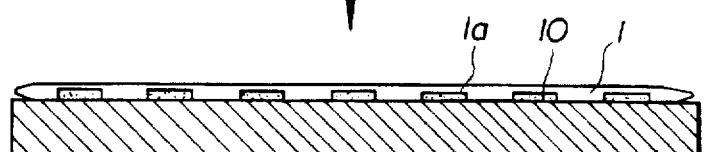

Next, in FIG. 3B, the discharge-proofing cover 1 is formed in the vicinity of the contact portions on both sides of the discharge electrodes 10. At this time, the discharge-proofing cover 1 is layered between the discharge electrodes 10 while a part 1a of the discharge-proofing cover 1 is layered on the discharge electrode 10. The discharge-proofing cover 1 is formed of the same material as the barrier ribs 9. However, the material of the cover 1 is of a viscosity about one-tenth as high as that of the barrier ribs 9 and is printed to a thickness of 10 to 15 μm using a fine-mesh screen.

Figure 3C:
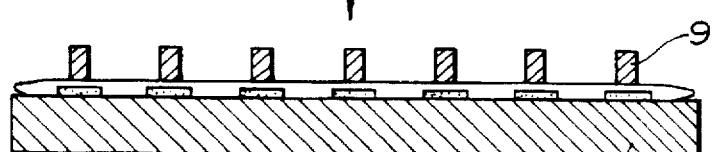

Next, in FIG. 3C, the barrier ribs 9 are formed by screen printing on the discharge electrodes 10. The upper portion of the barrier rib 9 thus formed is raised over the discharge-proofing cover 1, as shown in FIG. 4A. After sintering, the upper parts of the barrier ribs 9 are ground off to give a smooth surface as shown in FIG. 4B.

Figure 3D:
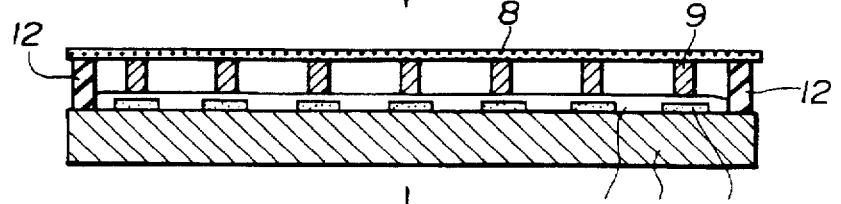
Figure 3E:
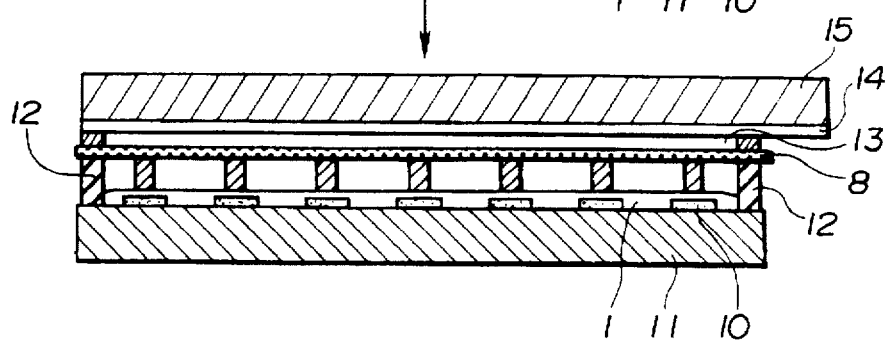

Then, as shown in FIG. 3D, the frit 12 is coated around the barrier ribs 9. Subsequently, the barrier ribs 9 and the microsheet glass 8 are bonded together to form a plasma cell. After evacuating the plasma cell, an ionizable gas is sealed into the plasma cell. As shown in FIG. 3E, the liquid crystal cell is constituted by charging a liquid crystal layer 13 between a glass substrate 15 and the microsheet glass 8. The glass substrate 15 has data electrodes 14 on its inner surface which run parallel to one another and at right angles to the discharge electrodes 10.

Figure 5:
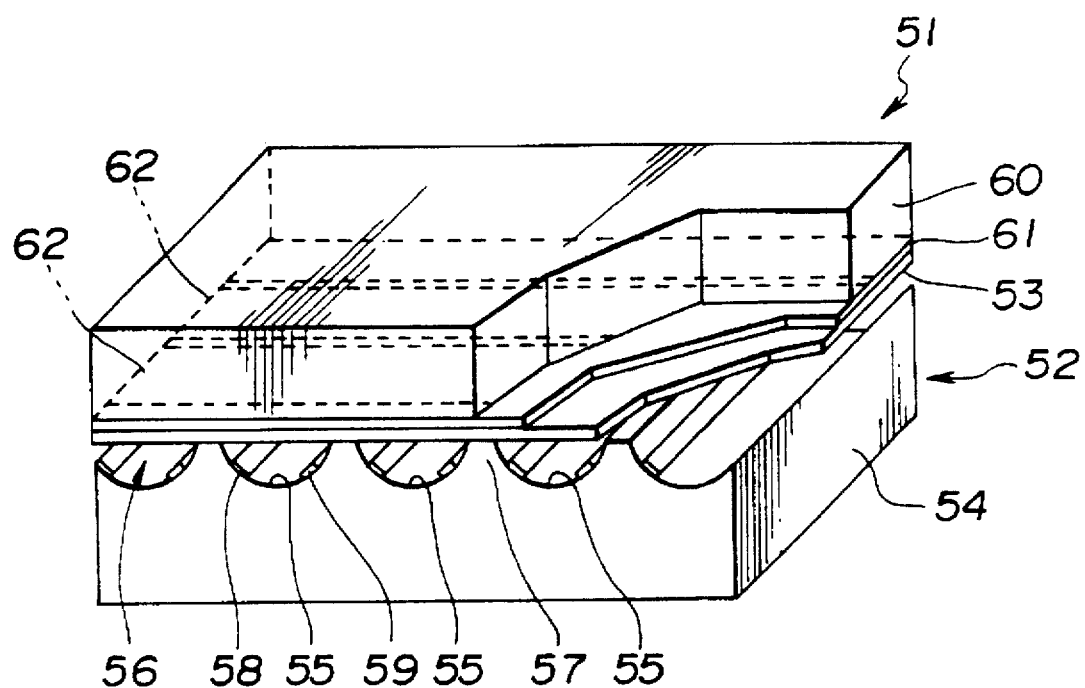
FIG. 5 is a schematic perspective view showing an example of a plasma addressed liquid crystal display device, with a portion thereof being broken away.

FIG. 5 shows an alternative plasma addressed liquid crystal display device in which a second electrode is formed within a channel formed by etching. The plasma addressed liquid crystal display device has a flat panel construction in which a liquid crystal cell 51 and a plasma cell 52 are stacked together with the interposition of a microsheet glass 53. The plasma cell 52 is formed using a lower side substrate 54 the upper surface of which are formed with plural parallel grooves 55. Each groove 55 is hermetically sealed by an intermediate substrate 53. An ionizable gas is sealed in each groove 55 to form separate discharge channels 56. A plurality of ribs 57 between the grooves 55 play the role of partitions or ribs separating the discharge channels 56 from one another and the role of a gap spacer for the lower side substrate 54 with respect to the microsheet glass 53. On the bottom of each groove 55, there are formed a pair of parallel electrodes 58, 59 performing the role of anode electrodes and cathode electrodes for ionizing the gas in the discharge channels 56 for producing plasma discharge.

On the other hand, the liquid crystal cell 51 has a liquid crystal layer 61 sandwiched between the microsheet glass 53 and an upper side substrate 60. On the inner surface of the upper side substrate are formed striped data electrodes 62 extending at right angles to the discharge channels 56. Matrix-shaped pixels are formed at the points of intersection between the data electrodes 62 as the row driving units and the discharge channels 56 as the column scanning units.

With the above-described device, a discharge-proofing cover of an insulating material may be formed by $SiO_2$ sputtering or resist. Specifically, for preparing the discharge-proofing cover by sputtering, a mask is first prepared and placed on the glass substrate having a second electrode formed in each groove thereof. The resulting assembly is directly charged into a sputtering device for forming an $SiO_2$ film to a thickness exceeding 0.2 µm. For preparing an insulator by s resist, the mask is prepared and the insulator is formed by the resist on the glass substrate.

With the above-described plasma addressed liquid crystal display device according to the present invention, abnormal discharge between neighboring cathodes may be eliminated by coating the vicinity of the contact area of the second electrode by an insulator so that the insulator is contacted with part of the second electrode side portions of the barrier ribs and sealing members. In addition, the microsheet glass may be bonded after the frit sealing process without cracking the microsheet glass.

What is claimed is:

1. A method for preparing a plasma addressed liquid crystal display device having a plasma cell and a display cell stacked together, comprising the steps of:

forming a plurality of discharge electrodes on a substrate;

covering the vicinity of contact areas of said discharge electrodes with an insulating film;

forming barrier ribs on the discharge electrodes covered by said insulating film;

grinding the top of said barrier ribs;

arranging a microsheet glass on the ground barrier ribs and bonding the microsheet glass to the substrate with a sealing member to form a plasma cell; and joining said plasma cell and said display cell together.

2. The method as claimed in claim 1, wherein said discharge electrodes are formed by printing procedure.

3. The method as claimed in claim 2, wherein said insulating film is formed by printing procedure.

4. The method as claimed in claim 3, wherein said barrier ribs are formed by printing procedure.

* * * * *